US010254386B1

(12) United States Patent
Beaudin et al.

(10) Patent No.: US 10,254,386 B1
(45) Date of Patent: Apr. 9, 2019

(54) WAVEFORM MODEL

(71) Applicant: Hewlett Packard Enterprise Development LP, Houston, TX (US)

(72) Inventors: Andre Beaudin, Montreal (CA); Gilbert Moineau, Montreal (CA); Scott McGrath, Montreal (CA)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 15/795,883

(22) Filed: Oct. 27, 2017

(51) Int. Cl.
| | |
|---|---|
| G01S 7/02 | (2006.01) |
| H04K 3/00 | (2006.01) |
| H04B 10/27 | (2013.01) |
| H04L 25/06 | (2006.01) |
| H04W 16/14 | (2009.01) |
| H04W 72/04 | (2009.01) |

(52) U.S. Cl.
CPC .............. G01S 7/021 (2013.01); G01S 7/023 (2013.01); H04K 3/226 (2013.01); H04L 25/063 (2013.01); H04B 10/27 (2013.01); H04K 2203/18 (2013.01); H04W 16/14 (2013.01); H04W 72/0453 (2013.01)

(58) Field of Classification Search
CPC ........ G01S 7/021; G01S 7/023; H04W 16/14; H04B 1/1027; H04K 3/226; H04K 2203/18; H04L 5/0062; H04L 63/1441
See application file for complete search history.

(56) References Cited

U.S. PATENT DOCUMENTS

| | | | |
|---|---|---|---|
| 7,623,060 | B1 | 11/2009 | Chhabra et al. |
| 7,702,044 | B2 | 4/2010 | Nallapureddy et al. |
| 9,000,971 | B2 | 4/2015 | Crowle |
| 9,439,197 | B1 | 9/2016 | Ngo et al. |
| 2003/0107512 | A1 | 6/2003 | McFarland |
| 2004/0033789 | A1* | 2/2004 | Tsien ...................... G01S 7/021 455/130 |

(Continued)

OTHER PUBLICATIONS

Cisco, "Cisco High Density Experience (HDX): Enhanced", At a Glance Sep. 2016, 2 Pages.

*Primary Examiner* — Ross Varndell
(74) *Attorney, Agent, or Firm* — Brooks, Cameron & Huebsch, PLLC (57) ABSTRACT

An access point may include a radio. The radio may receive a waveform, and the waveform may comprise a plurality of pulses. The access point may further include a hardware processor coupled to the radio. The hardware processor may determine a model of the received waveform. Determining a model of the received waveform may include extracting a plurality of characteristics corresponding to the received waveform, determining a plurality of parameters, wherein each of the plurality of parameters is based on a corresponding characteristic of the plurality of characteristics, and constructing an output waveform model based on the plurality of parameters, wherein the output waveform model corresponds to the received waveform. The hardware processor may further transmit the output waveform model to the hardware processor as an input waveform, wherein the input waveform is to tune the model. Moreover, the access point may include a dynamic frequency switching (DFS) module coupled to the hardware processor to receive the output waveform model.

18 Claims, 4 Drawing Sheets

(56) References Cited

U.S. PATENT DOCUMENTS

| | | | |
|---|---|---|---|
| 2008/0244707 A1* | 10/2008 | Bowser | H04L 63/1441 726/4 |
| 2009/0160696 A1 | 6/2009 | Pare et al. | |
| 2009/0310661 A1 | 12/2009 | Kloper et al. | |
| 2010/0039308 A1 | 2/2010 | Bertagna | |
| 2013/0128927 A1 | 5/2013 | Yucek et al. | |
| 2015/0085958 A1 | 3/2015 | Gao et al. | |

* cited by examiner

WAVEFORM MODEL

BACKGROUND

Access points (APs) may receive wireless signals from both inside a wireless network and from sources external to the wireless network. In some examples, externally sourced wireless signals may be radar signals. Some radar signals are protected radar signals; that is, some radar signals are regulated, and an AP may not be permitted to operate on the same channel as a regulated radar signal. Therefore, an AP may have the ability to detect whether a particular wireless signal is a regulated, or protected, radar signal.

DETAILED DESCRIPTION

Wireless networks may include a number of access points (APs) to facilitate wireless service to users of the network. An AP can refer to a networking device that allows a client device to connect to a wired or wireless network. As used herein, the term "access point" (AP) can, for example, refer to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards. An AP can include a processing resource, memory, and/or input/output interfaces, including wired network interfaces such as IEEE 802.3 Ethernet interfaces, as well as wireless network interfaces such as IEEE 802.11 wireless local area network (WLAN) interfaces, although examples of the disclosure are not limited to such interfaces. An AP can include a memory resource, including read-write memory, and a hierarchy of persistent memory such as ROM, EPROM, and Flash memory.

An AP may include a radio. As used herein, a radio refers to the component of an AP that receives wireless signals, such as signals from the wireless network in which the AP is operating. A radio may also receive signals that are not transmitted by the wireless network. For example, a radio may receive a radar signal. As used herein, a radar signal may refer to a particular type of radio wave. Radar signals may operate over a wide range of frequencies (e.g., 3 MHz to 110 GHz). WLAN operates within the 5 GHz frequency band; thus, the frequency band for WLAN may overlap with a frequency band used by radar.

Within the 5 GHz band, an AP in a WLAN may operate on a variety of channels. As used herein, a channel refers to a particular data transmission path that may be used to transmit data by, for example, an AP. A single frequency band may have a plurality of channels, thus allowing APs to transmit data over multiple paths while still remaining within the frequency band. Moreover, an AP may switch between channels. An AP may switch channels when, for instance, a particular channel is experiencing a large amount of interference that is affecting the quality of the wireless service the AP is able to provide, although examples are not so limited.

Another reason an AP may switch between channels may be due to RADAR interference experienced on a particular channel. A radio of an AP may receive an unknown waveform. As used herein, a waveform refers to a representation of a particular signal. A waveform may include information corresponding to the underlying signal. In some examples, a waveform may be comprised of multiple pulses. As used herein, a pulse refers to an individual signal within the overall signal transmitted in the waveform.

Upon receipt at the radio, the unknown waveform may be forwarded to a Dynamic Frequency Switching (DFS) module within the AP. As used herein, a DFS module refers to a radio sub-system that detects and determines whether a received waveform is a protected radar waveform. A protected radar waveform refers to a radar waveform that, if detected on a DFS module, may cause the DFS module to change an operating frequency of the AP on which the DFS module is operating. To determine whether a waveform is a protected radar waveform, a DFS module may utilize a model into which characteristics of an unknown waveform may be inputted. Based on the characteristics of the unknown waveform, the DFS module may determine that the unknown waveform is a protected radar waveform. In such examples, regulations, often set by a country, may alert the AP to switch its operating channel to one on which the protected radar waveform is not operating. By contrast, if the characteristics of the unknown waveform do not match characteristics of a protected radar waveform, the DFS module may determine that the unknown waveform does not correspond to a protected radar waveform; thus the AP may remain on its current operating channel.

In some examples, however, the DFS module may incorrectly identify a non-protected radar waveform as a protected radar waveform. This incorrect identification may be referred to as a false positive. When a false positive occurs, it may be desirable to adjust or alter the model being used by the DFS module to determine whether unknown waveforms are protected radar waveforms. However, altering the model may be time-consuming and expensive. The model may be complex, meaning that it may need an engineer familiar with the model to make the adjustments. Moreover, once the model has been adjusted, it may be desirable to test the adjusted model to, for example, ensure that the adjustment addresses the characteristics that led to a false positive result. To do this, a model of the waveform that was falsely identified as a radar waveform may be created. Creating a model may involve the use of specialized equipment, such as a wireless recorder, to retrieve the characteristics of the waveform. Moreover, for testing to occur, a created model may be replayed, which may again involve the use of equipment such as a wireless recorder. As a result, the time involved to create and replay a waveform may be extensive. Additionally, while the DFS model may be adjusted, such adjustments may not carry through when, for example, an update is performed on the AP. As a result, the false positives originally addressed by the adjustment of the DFS model may not be addressed by the DFS model after an update.

A waveform model consistent with the present disclosure, by contrast, may allow an AP itself to create a model of an unknown waveform. As described previously, a waveform refers to a representation of a signal, and may include multiple individual pulses. A waveform may be received at a radio of an AP. Then, characteristics of the waveform may be extracted. Based on these characteristics, a model of the unknown waveform may be created. The model may include a plurality of parameters that correspond to the characteristics of the unknown waveform. The model may then be forwarded to a DFS module for testing and to determine whether the unknown waveform is a protected radar signal.

In addition, the model may be converted into an input model and retransmitted within the AP. This may allow refinement of the model used to determine whether an unknown pulse is a protected radar pulse. Said differently, the output model of the unknown waveform may be reintroduced to the AP for further testing and refinement. This may allow the AP to refine its DFS model without an outside source, such as an engineer, performing the adjustments.

Figure 1:
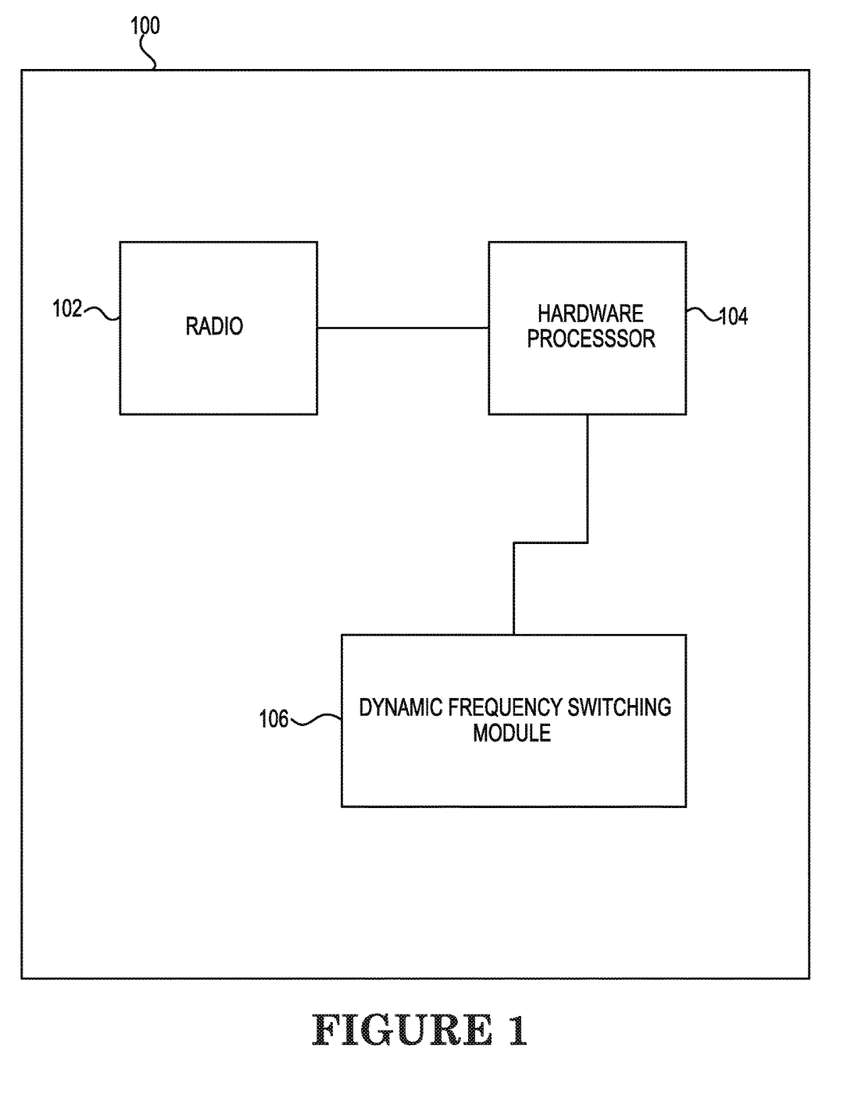
FIG. 1 is an example access point for use with a waveform model consistent with the present disclosure.

FIG. 1 is an example access point (AP) 100 for use with a waveform model consistent with the present disclosure. As described previously, an AP may refer to a networking device that allows a client device to connect to a wired or wireless network. AP 100 may include a radio 102. As described previously, a radio refers to the component of an AP, such as AP 100, that receives wireless signals. Thus, radio 102 may receive wireless signals, both from a wireless network in which AP 100 may be operating, as well as from sources external to a wireless network, such as a radar pulse. Radio 102 may receive a waveform. In some examples, the waveform may comprise a plurality of pulses. That is, the waveform received by radio 102 may include a plurality of individual transmissions, or pulses, that collectively form the waveform. As described previously, the waveform received by radio 102 may be an external waveform, such as a radar waveform comprised of radar pulses, or an internal waveform, such as a wireless transmission by a wireless network.

AP 100 may include a hardware processor 104. As used herein, a hardware processor refers to a system within a device, such as AP 100, that receives inputs, provides outputs, and controls the function of the device. Radio 102 may be coupled to hardware processor 104. Thus, hardware processor 104 may, for example, receive an input from radio 102. In some examples, the input received at hardware processor 104 may be the waveform received by radio 102. Upon receipt of an input, such as a received waveform, hardware processor 104 may determine a model of the received waveform. Hardware processor 104 is further discussed herein with respect to FIG. 2.

AP 100 may further include a dynamic frequency switching (DFS) module 106. As described previously, a DFS module refers to a radio sub-system that detects and determines whether a received waveform is a protected radar waveform. DFS module 106 may be coupled to hardware processor 104. DFS module 106 may receive a waveform model from hardware processor 104. In some examples, upon receipt of a waveform model, such as from hardware processor 104, DFS module 106 may analyze the waveform model. DFS module 106 is further discussed herein with respect to FIG. 2.

Figure 2:
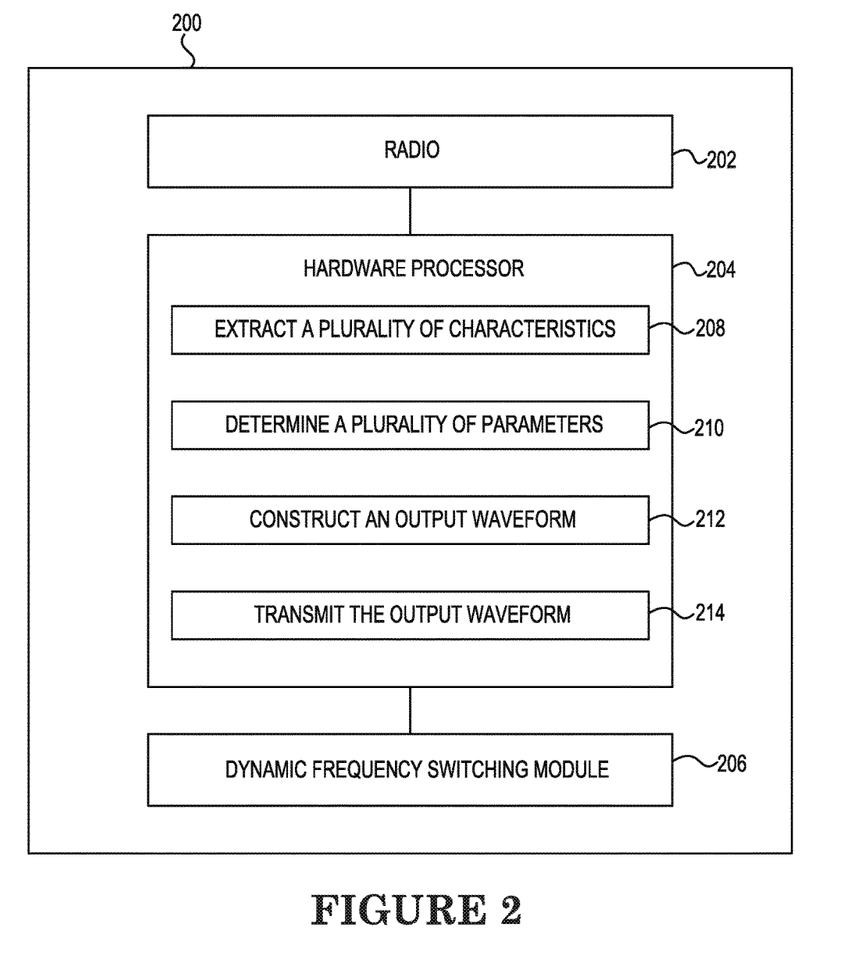
FIG. 2 is another example access point for use with a waveform model consistent with the present disclosure.

FIG. 2 is another example access point 200 for use with a waveform model consistent with the present disclosure. AP 200 may be akin to AP 100, discussed with respect to FIG. 1. AP 200 may include a radio 202. Radio 202 may be akin to radio 102, described with respect to FIG. 1.

AP 200 may include a hardware processor 204. Hardware processor 204 may be akin to hardware processor 104, shown in FIG. 1. Hardware processor 204 may be coupled to hardware processor 202. As described with respect to FIG. 1, hardware processor 204 may determine a model of a waveform. In some examples, hardware processor 204 may determine a model of a received waveform, where the received waveform is the waveform received by radio 202. To determine a model of a received waveform, such as a waveform received by radio 202, hardware processor 204 may engage in additional steps, such as steps 208, 210, 212, 214, or a combination thereof, with respect to the received waveform.

At 208, hardware processor 204 may extract a plurality of characteristics corresponding to the received waveform. As used herein, a characteristic refers to a particular feature of the waveform. Hardware processor 204 may extract a frequency of the waveform at 208. As used herein, a frequency refers to the particular waveband at which a signal is transmitted. A particular waveband may transmit energy (e.g., a waveform) at a particular rate of vibration. Therefore, frequency may correspond to the rate of vibration of the energy that constitutes the waveform. Hardware processor 204 may also extract a duration of the waveform. As used herein, a duration refers to an amount of time over which something occurs. For example, a waveform may have a duration during which a pulse or a plurality of pulses is transmitted. A greater duration may correspond to a longer waveform and/or a greater number of pulses being transmitted.

In some examples, a pulse repetition interval (PRI) may be extracted at 208. As used herein, a PRI refers to an amount of time between a beginning of one pulse and a beginning of a subsequent pulse. Said differently, a PRI refers to the time that elapses between the beginning of a first pulse and the beginning of a second pulse. A greater PRI corresponds to a greater amount of time between two consecutive pulses, and thus fewer pulses transmitted in a particular period of time. Conversely, a smaller PRI corresponds to a lesser amount of time between two consecutive pulses, and thus more pulses transmitted in a particular period of time.

Hardware processor 204 may further extract a gain at 208. As used herein, a gain refers to a ratio of a signal output to a signal input. Gain may correspond to an increase in power level between the signal input and the signal output, and may occur via an amplifier, although examples are not so limited. Hardware processor 204 may additionally extract a magnitude. As used herein, a magnitude refers to an amount above a baseline, such as zero, that a wave of signal is. A greater magnitude may correspond to a greater amount above the baseline. Magnitude may describe the energy of the waveform, with a greater magnitude indicating a greater amount of energy contained within the waveform.

At 210, hardware processor 204 may determine a plurality of parameters. As used herein, a parameter refers to a measurable factor that forms part of a set that defines a system and/or sets conditions for operation of the system. A parameter may be a numerical value, although examples are not so limited. Each of the plurality of parameters may be based on a corresponding characteristic of the plurality of characteristics. In some examples, the plurality of characteristics may be the plurality of characteristics extracted by the hardware processor 204 at 208. Thus, separate parameters may be determined at 210 for frequency, duration, PRI, gain, magnitude, and/or a combination or subset thereof.

At 212, hardware processor 208 may construct an output waveform model. As used herein, an output waveform model refers to a waveform model determined by hardware processor 208. The output waveform model determined at 212 may be constructed based on the plurality of parameters determined at 210. Said differently, the output waveform model determined at 212 may be constructed using the determined parameters, such that the output waveform model represents a waveform meeting the parameters determined at 210. Moreover, as the plurality of parameters determined at 210 may correspond to the plurality of characteristics of the received waveform extracted at 208, the output waveform model constructed at 212 may correspond to the received waveform. That is, the output waveform model constructed by hardware processor 208 may be a model of the received waveform model received by radio 202.

At 214, hardware processor 208 may transmit the output waveform to the hardware processor as an input waveform. That is, hardware processor 208 may convert the output waveform constructed at 212 to an input waveform, such that hardware processor 208 is able to receive the output waveform. Upon receipt of the new input waveform, hardware processor 208 may repeat steps 208, 210, and/or 212. That is, hardware processor 208 may extract a plurality of characteristics, determine a plurality of parameters, and/or construct an output waveform. This may aid hardware processor 208 in tuning the model. As used herein, tuning the model refers to refinement of a model to increase accuracy thereof. Thus, by receiving the output waveform as an input waveform at 214, hardware processor 208 may perform additional refinement of the output waveform, as well as change the mechanisms by which subsequent output waveform models may be constructed. Moreover, hardware processor 208 may transmit an output waveform model, such as a model constructed at 212, to a DFS module, such as DFS module 206.

AP 200 may further include a DFS module 206. DFS module 206 may be akin to DFS module 106, described with respect to FIG. 1. As previously discussed, a DFS module refers to a radio sub-system that detects and determines whether a received waveform is a protected radar waveform. DFS module 206 may be coupled to hardware processor 204, and may receive an output waveform model from hardware processor 204. In some examples, the output waveform model received by DFS module 206 may be the output waveform model constructed by hardware processor 204 at 212.

DFS module 206 may further analyze the output waveform model. In some examples, DFS module 206 may analyze the output waveform model based on the plurality of pulses. That is, DFS module 206 may use the plurality of pulses making up the original waveform received by radio 202 to analyze the output waveform model. DFS module 206 may determine that a subset of the plurality of parameters of the output waveform model match parameters of a known waveform. Said differently, DFS module 206 may compare the plurality of parameters used to construct the output waveform model to parameters of known waveforms. The known waveforms may be stored within DFS module 206, and may correspond to waveforms known to correspond to, for instance, radar pulses, although examples are not so limited. DFS module 206 may then determine that a subset of the plurality of parameters of the output waveform model match the corresponding parameters of a known waveform.

Upon a determination that a subset of the plurality of parameters of the output waveform model match a known waveform, DFS module 206 may further compare a signal strength of the output waveform model to the signal strength of the known waveform. Comparing the signal strength of the output waveform model with the signal strength of the known waveform (i.e., the waveform with which the subset of the plurality of parameters matched) may serve to confirm at the DFS module 206 that the output waveform model corresponds to the known waveform. A signal strength match between the output waveform model and the known waveform may alert the DFS module 206 that the received waveform, used to construct the output waveform model, is akin to the known waveform. In some examples, a determination that the signal strength of the output waveform model matches the signal strength of the known waveform may cause a determination that the output waveform model corresponds to a protected radar waveform.

A comparison of the signal strength of the output waveform model with the signal strength of the known waveform by DFS module 206 may also indicate a mismatch between the output waveform model and the known waveform model. That is, a signal strength of an output waveform model may differ from the signal strength of the known waveform model, even when other parameters of the output waveform model match corresponding parameters of the known waveform model. In some examples, a disparity between the signal strength of the output waveform model and the known waveform model may indicate a non-protected radar waveform. Said differently, DFS module 206 may determine that the output waveform model is a false positive. As described previously, a false positive refers to an incorrect identification of a non-protected radar waveform as a protected radar waveform. DFS module 206 may determine that the output waveform model is a false positive based on the signal strength of the output waveform model not matching the signal strength of the known waveform model. A non-protected radar waveform may have similar or identical parameters to a protected radar waveform, with the difference between the non-protected and the protected radar waveforms being the signal strength of the waveforms. Thus, while DFS module 206 may initially identify a non-protected radar waveform as a protected radar waveform based on a subset of the plurality of parameters of the output waveform model matching corresponding parameters of the known waveform. DFS module 206 may then compare signal strength to determine whether the output waveform model corresponds to a protected radar waveform or whether the output waveform model corresponds to a non-protected radar waveform.

Based on the analysis of the output waveform model, DFS module 206 may perform an action. In some examples, the action performed by DFS module 206 may be dependent on the results of the analysis of the output waveform model. When the analysis performed by DFS module 206 leads to a determination by DFS module 206 that the output waveform model matches a known waveform, DFS module 206 may switch an operating frequency of AP 200. As described previously, a determination that the output waveform model matches a known waveform may indicate that the received waveform (represented by the output waveform model) is a protected radar waveform. When the output waveform model is determined to correspond to a protected radar waveform, DFS module 206 may move the operating frequency of AP 200 to comply with the particular operating regulations of the country in which AP 200 is operating.

By contrast, when the analysis performed by DFS module 206 leads to a determination by DFS module 206 that the output waveform model does not match a known waveform, DFS module 206 may refrain from switching an operating frequency of AP 200. Said differently, when DFS module 206 determines that the output waveform model is either a total mismatch to a known waveform (i.e., none of the parameters of the output waveform model match a known waveform) or is a false positive, DFS module 206 may maintain the operating frequency of AP 200.

DFS module 206 may further store the output waveform model. In some examples, the output waveform model may be stored in hardware of the DFS module 206. Storing the output waveform model in hardware of the DFS module 206 may allow DFS module 206 to retain the output waveform model through updates performed to both DFS module 206 and to AP 200. Therefore, DFS module 206 may be able to compare future received output waveform models to the stored output waveform model to assist in determining a status of a received output waveform model.

Figure 3:
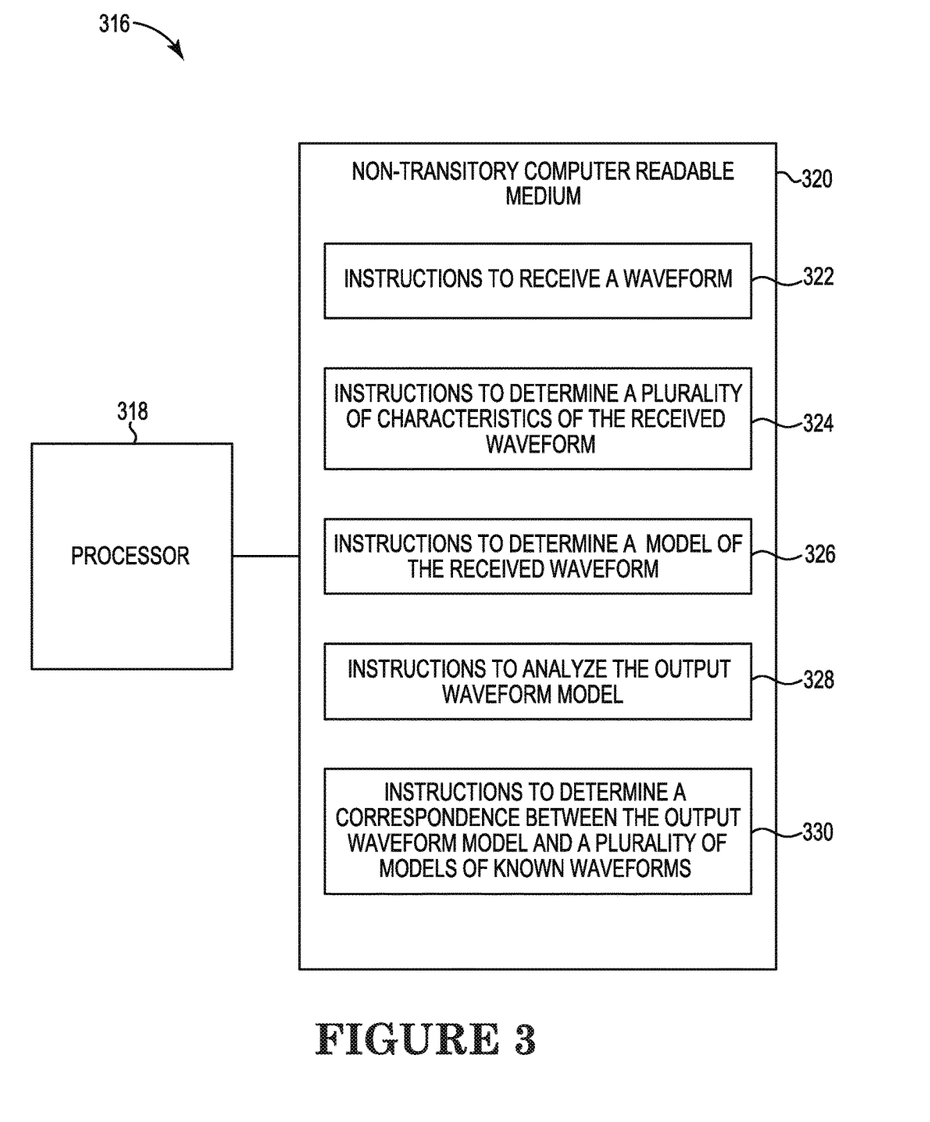
FIG. 3 is an example system for a waveform model consistent with the present disclosure.

FIG. 3 is an example system 316 for a waveform model consistent with the present disclosure. System 316 may include a processor 318. System 316 may further include a non-transitory computer readable medium 320, on which may be stored instructions, such as instructions 322, 324, 326, 328, and 330. Although the following descriptions refer to a single processor and a single memory, the descriptions may also apply to a system with multiple processors and multiple memories. In such examples, the instructions may be distributed (e.g., stored) across multiple non-transitory computer readable mediums and the instructions may be distributed (e.g., executed by) across multiple processors.

Processor 318 may be a central processing unit (CPU), a semiconductor based microprocessor, and/or other hardware devices suitable for retrieval and execution of instructions stored in non-transitory computer readable medium 320. Processor 318 may fetch, decode, and execute instructions 322, 324, 326, 328, 330, or a combination thereof. As an alternative or in addition to retrieving and executing instructions, processor 318 may include at least one electronic circuit that includes electronic components for performing the functionality of instructions 322, 324, 326, 328, 330, or a combination thereof.

Non-transitory computer readable medium 320 may be electronic, magnetic, optical, or other physical storage device that stores executable instructions. Thus non-transitory computer readable medium 320 may be, for example, Random Access Memory (RAM), an Electrically-Erasable Programmable Read-Only Memory (EEPROM), a storage drive, an optical disc, and the like Non-transitory computer readable medium 320 may be disposed within system 316, as shown in FIG. 3. In this example, the executable instructions may be "installed" on the system. Additionally and/or alternatively, non-transitory computer readable medium 320 may be a portable, external or remote storage medium, for example, that allows system 316 to download the instructions from the portable/external/remote storage medium. In this situation, the executable instructions may be part of an "installation package". As described herein, non-transitory computer readable medium 320 may be encoded with executable instructions for a waveform model.

Instructions 322, when executed by a processor such as processor 318, may include instructions to receive a waveform at a radio of an AP. The AP may be AP 100, discussed with respect to FIG. 1, or AP 200, discussed with respect to FIG. 2. The waveform may comprise a plurality of pulses. That is, the waveform may be made up of a series of individual pulses.

Instructions 324, when executed by processor 318, may include instructions to determine a plurality of characteristics of the received waveform. As described with respect to FIG. 2, a characteristic refers to a particular feature of a waveform. In some examples, processor 318 may extract a plurality of characteristics from the waveform received at the radio of the access point. The plurality of characteristics may include a frequency of the waveform, a duration of the waveform, a PRI of the pulses comprising the waveform, a gain, and/or a magnitude, although examples are not so limited.

Instructions 326, when executed by processor 318, may include instructions to determine a model of the received waveform. In some examples, the instructions to determine a model of the received waveform may include instructions to determine a plurality of parameters. As described previously, a parameter refers to a measurable factor forming part of a set defining a system. Each parameter of the plurality of parameters may correspond to a particular characteristic of the plurality of characteristics determined by instructions 324. Thus, for example, a frequency determined as a characteristic by instruction 324 may have a corresponding frequency parameter determined by instructions 326. A parameter may be determined for each of the characteristics determined by instruction 324; however, examples are not so limited and a parameter may be determined for a subset of the characteristics.

Instructions 326 may further include instructions to construct an output waveform model. In some examples, the output waveform model may be constructed based on the plurality of parameters. That is, the output waveform may be constructed using the plurality of parameters, such that the plurality of parameters define the output waveform model. Because the plurality of parameters corresponds to the plurality of characteristics of the received waveform determined by instructions 324, the output waveform model constructed using the plurality of parameters may correspond to the received waveform. Said differently, the output waveform model may correspond to the waveform model received by instructions 322 due to the plurality of parameters corresponding to characteristics of the received waveform model.

In some examples, instructions 326 may include instructions to receive the plurality of characteristics. The plurality of characteristics may be the plurality of characteristics of the received waveform model determined by instructions 324. Instructions 326 may further include instructions to organize the plurality of characteristics into a model of the received waveform. That is, instructions 326 may include instructions to construct a model of the received waveform using the plurality of characteristics determined by instructions 324. In such examples, the model of the received waveform may be constructed without the use of a plurality of parameters corresponding to the plurality of characteristics; rather, the model of the received waveform may be determined using the actual characteristics of the received waveform.

Instructions 326 may include further instructions to transmit the output waveform model as an input waveform model. In some examples, the output waveform model may be transmitted as an input waveform model to the radio of the AP. Upon receipt of the input waveform model, instructions 322, 324, and/or 326 may be re-executed by processor 318. That is, the input waveform model may be received at a radio of an AP (instructions 322), a plurality of characteristics of the input waveform model may be determined (instructions 324), and/or a model of the input waveform model may be determined (instructions 326). As described with respect to FIG. 2, transmitting the output waveform model as an input waveform model may assist in tuning the system (such as system 316) and refining the model.

Instructions 328, when executed by processor 318, may include instructions to analyze the output waveform model. In some examples, the output waveform model may be analyzed based on the plurality of pulses. That is, when the waveform received by instructions 322 is a waveform made up of a plurality of pulses, the output waveform model may reflect this particular characteristic of the received waveform; thus, the output waveform model may be analyzed based on this plurality of pulses. Analysis of the output waveform model may include analyzing the plurality of parameters and/or characteristics that make up the output waveform model.

Instructions 330, when executed by processor 318, may include instructions to determine a correspondence between the output waveform model and a plurality of models of known waveforms. The plurality of models of known waveforms may be stored in processor 318 and may include models of protected radar waveforms. In some examples, the instructions to determine a correspondence may be based on the analysis of the model of the output waveform model. Determining a correspondence between the output waveform model and a plurality of models of known waveforms may include determining that a subset of the plurality of parameters of the output waveform model match a corresponding subset of a plurality of parameters of a known waveform model. In such examples, a signal strength of the output waveform model may further be compared to the signal strength of the known waveform model.

In some examples, instructions 330 may include instructions to transmit the output waveform model to a DFS module of the access point. The DFS module may be akin to DFS module 106, described with respect to FIG. 1, and/or DFS module 206, described with respect to FIG. 2. As previously described, a DFS module is a radio sub-system that determines whether a received waveform is a protected radar waveform. Instructions 330 may include further include instructions to determine a categorization of the output waveform model. The categorization of the output waveform model may occur at the DFS module. In some examples, DFS module may categorize the output waveform as a protected radar waveform, a non-protected radar waveform, or a non-radar waveform, although examples are not so limited.

System 316 may include instructions to determine that the output waveform model matches a model of the plurality of models of known waveforms. The output waveform model may be determined to match a known waveform model based on the determination of a correspondence between the output waveform model and the plurality of known waveform models by instruction 330. In some examples, the output waveform model may be determined to match a known waveform model based on a subset of the plurality of parameters of the output waveform model matching corresponding parameters of the known waveform models and a signal strength of the output waveform model matching a signal strength of the known waveform model.

In some examples, the known waveform model may correspond to a protected radar waveform. As described previously, a protected radar waveform to a radar waveform that, if detected, may cause a change in an operating frequency of the AP on which the waveform was detected or received. In such examples, system 316 may further include instructions to change an operating frequency of the access point. The change in operating frequency of the access point may occur in response to the determination that the output waveform model matches a model of the plurality of waveform models.

System 318 may further include instructions executable by processor 318 to determine that the output waveform model does not match a model of the plurality of models of known waveforms. In some examples, the determination that the output waveform model does not match a known waveform model may be based on a determination that a plurality of parameters of the output waveform model differs from a corresponding plurality of parameters of a known waveform model. In such examples, the output waveform model may be determined to correspond to a non-radar waveform.

In some examples, the determination that the output waveform model does not match a known waveform model does not match a model of the plurality of known waveform models may be based on a signal strength of the output waveform model not matching a signal strength of a known waveform model. In such examples, a subset of parameters of the output waveform model may first be determined to correspond to a known waveform model (by, for example, instructions 330). Upon a determination that a subset of parameters of the output waveform model match a corresponding subset of parameters of a known waveform model, the signal strengths of the two models may be compared. As described previously, a disparity between the signal strength of the output waveform model and the known waveform model may indicate a non-protected radar waveform, or a false positive.

Upon a determination that the output waveform model does not match a known, or protected, waveform, system 316 may include instructions executable to refrain from changing an operating frequency of the access point. In some examples, the operating frequency of the access point may not be changed in response to the determination that the output waveform model does not match a protected radar waveform.

System 316 may further include instructions executable by processor 318 to store the output waveform model. In some examples, the output waveform model may be stored within processor 318. The output waveform model may be stored in a log of models of received waveforms. In some examples, hardware processor 318 may further retain the stored model of the output waveform model. This may allow for comparison of future waveform models with the stored model of the output waveform model.

Figure 4:
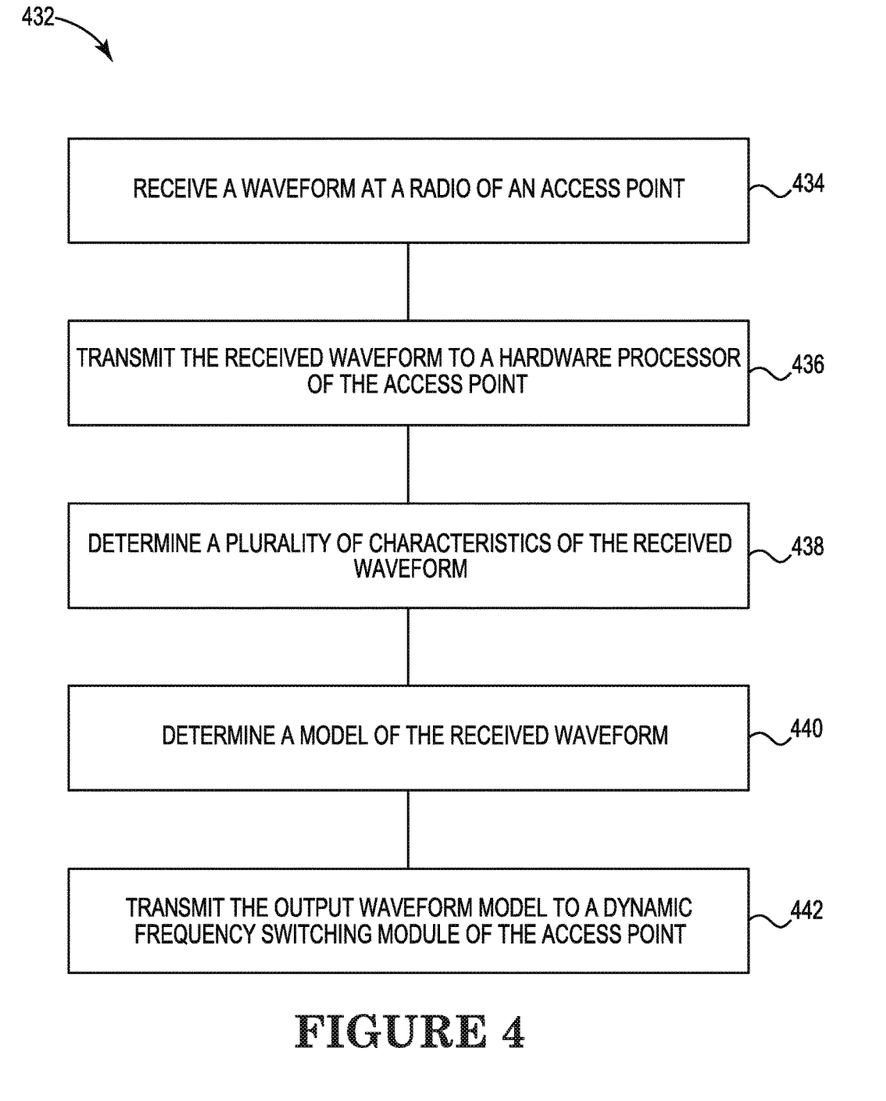
FIG. 4 is an example method for a waveform model consistent with the present disclosure.

FIG. 4 is an example method 432 for a waveform model consistent with the present disclosure. At 434, method 432 may include receiving a waveform. The waveform may be received at a radio of an AP, such as radio 102 or radio 202, described with respect to FIGS. 1 and 2, respectively. The waveform may be an external waveform, with a source external to a wireless network in which the AP is operating, or an internal waveform, from within the wireless network. In some examples, the waveform may be comprised of a plurality of pulses, and the radio may receive each of the plurality of pulses.

At 436, method 432 may include transmitting the received waveform. The received waveform may be transmitted to a hardware processor, such as hardware processor 104, described with respect to FIG. 1, or hardware processor 204, described with respect to FIG. 2. In some examples, the hardware processor may be located on the access point, and may be coupled to the radio at which the waveform was received.

At 438, method 432 may include determining a plurality of characteristics of the received waveform. The plurality of characteristics may be determined by the hardware processor upon receipt of the received waveform at 436. In some examples, determining a plurality of characteristics of the received waveform may comprise extracting information corresponding to the received waveform from the received waveform. That is, determining a plurality of characteristics at 438 may include retrieving information contained within the received waveform that describe features of the waveform.

At 440, method 432 may include determining a model of the received waveform. In some examples, the model may be determined by the hardware processor. The model of the received waveform may be determined based on the characteristics of the received waveform determined at 438. That is, the characteristics of the received waveform determined at 438 may be used to construct a model of the received waveform at 440.

In some examples, determining a model of the received waveform at 440 may include determining a plurality of parameters. As described previously, the plurality of parameters may correspond to the plurality of characteristics, such that each of the plurality of parameters may have a corresponding characteristic. In some examples, the plurality of parameters may be determined by the hardware processor and may be based on the plurality of characteristics determined at 438.

Determining a model of the received waveform at 440 may further include constructing an output waveform model. In some examples, the output waveform model may be constructed based on the plurality of parameters. In such examples, the output waveform model may correspond to the received waveform. That is, the output waveform model may share a plurality of characteristics, and thus parameters, with the received waveform model.

In some examples, determining a model of the received waveform at 440 may include transmitting the output waveform model to a hardware processor as an input waveform model. The hardware processor to receive the input waveform model may be the hardware processor that received the waveform from the radio of the access point. Examples are not so limited, however, and the hardware processor may be a different hardware processor. In some examples, transmitting the output waveform model to a hardware processor as an input waveform model may cause the hardware processor to re-engage in 438 and/or 440 of method 432. That is, the hardware processor may determine a plurality of characteristics of the input waveform model (block 438) and/or may determine a model of the input waveform (block 440). This may allow the hardware processor to refine the output waveform model.

At 442, method 432 may include transmitting the output waveform. The output waveform may be transmitted to a DFS module of the access point. The DFS module may be akin to DFS module 106, described with respect to FIG. 1, or DFS module 206, described with respect to FIG. 2. As described previously, the DFS module may receive the output waveform to determine a categorization of the output waveform.

Method 432 may further include analyzing the output waveform model. The output waveform model may be analyzed at the DFS module upon receipt of the output waveform model at the DFS module. In some examples, the output waveform model may be analyzed based on a plurality of pulses of the received waveform. That is, the output waveform model may be analyzed based on the pulses that made up the received waveform.

In some examples, analyzing the output waveform model may include determining that the output waveform model matches a model of a plurality of models of known waveforms. The known waveform models may be stored within the DFS module and may include models of waveforms known to correspond to protected radar waveforms. Determining that the output waveform model matches a known model may include comparing a subset of a plurality of parameters of the output waveform model with the corresponding subset of a plurality of parameters for each of the models of the plurality of known models.

Upon a determination that a subset of the plurality of parameters of the output waveform model match a known waveform, determining that the output waveform model matches a known model may further comprise comparing a signal strength of the output waveform model to the signal strength of the known waveform. Comparing the signal strength of the output waveform model with the signal strength of the known waveform (i.e., the waveform with which the subset of the plurality of parameters matched) may serve to confirm that the output waveform model corresponds to the known waveform. Moreover, a signal strength match between the output waveform model and the known waveform may alert the DFS module that the output waveform model, and thus the received waveform, corresponds to a radar pulse. In some examples, the designation of the received waveform as a radar pulse may occur based on the determination that the output waveform model matches a model of the plurality of models of known waveforms. Designating the received waveform as a radar pulse may further include designating the received waveform as corresponding to a protected radar pulse. In such examples, the DFS module may switch an operating frequency of the access point.

In some examples, analyzing the output waveform model may further comprise determining that the output waveform model does not match a model of a plurality of models of known waveforms. Determining that the output waveform model does not match a known waveform model may be based on a comparison of a subset of the plurality of parameters of the output waveform models with a corresponding subset of a plurality of parameters of known waveform models. In some examples, the subset of the plurality of parameters of the output waveform model may be determined to not match a corresponding subset of the plurality of parameters for the plurality of known waveform models. In such examples, the mismatch between the output waveform model and the plurality of known waveform models may cause the received waveform to be designated as a non-radar waveform.

In other examples, the determination that the output waveform model does not match a known waveform model does not match a model of the plurality of known waveform models may be based on a signal strength of the output waveform model not matching a signal strength of a known waveform model. In such examples, a subset of parameters of the output waveform model may first be determined to correspond to a known waveform model. Upon a determination that a subset of parameters of the output waveform model match a corresponding subset of parameters of a known waveform model, the signal strengths of the two models may be compared. As described previously, a disparity between the signal strength of the output waveform model and the known waveform model may indicate a non-protected radar waveform, or a false positive. In such examples, the received waveform may be designated as a non-radar pulse based on the determination that the output waveform model does not match a model of the plurality of known waveform models.

Method 432 may further comprise storing the output waveform model at a log of the AP. The log of the AP may be located on the hardware processor of the AP and/or on the DFS module of the AP, although examples are not so limited. In some examples, the log may be located within hardware of the AP, such that the AP may retain the log after updates are performed to the AP. The log may comprise previously received output waveform models, and may allow the AP to compare future output waveform models to the log of output waveform models. This may assist with categorization of output waveform models.

In the foregoing detail description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. Further, as used herein, "a number of" an element and/or feature can refer to any number of such elements and/or features.

What is claimed:

1. An access point, comprising:
    a radio to receive a waveform, wherein the waveform comprises a plurality of pulses;
    a hardware processor coupled to the radio to determine a model of the received waveform, wherein to determine a model of the received waveform, the hardware processor is further to:
    extract a plurality of characteristics corresponding to the received waveform;
    determine a plurality of parameters, wherein each of the plurality of parameters is based on a corresponding characteristic of the plurality of characteristics;
    construct an output waveform model based on the plurality of parameters, wherein the output waveform model corresponds to the received waveform; and
    transmit the output waveform model to the hardware processor as an input waveform, wherein the input waveform is to tune the model; and
    a dynamic frequency switching (DFS) module coupled to the hardware processor to:
    receive the output waveform model;
    analyze the output waveform model based on the plurality of pulses by determining that a subset of the plurality of characteristics corresponding to the received waveform match a known waveform, and determining that a signal strength of the received waveform matches a signal strength of the known waveform; and
    perform an action based on the analysis of the output waveform model.

2. The access point of claim 1, wherein the DFS module to analyze the output waveform model based on the plurality of pulses comprises the DFS module to:
    determine that a subset of the plurality of characteristics corresponding to the waveform match a known waveform;
    determine that a signal strength of the waveform does not match a signal strength of the known waveform; and
    based on the determination that the signal strength of the waveform does not match the signal strength of the known waveform, determine that the received waveform is a false positive.

3. The access point of claim 1, wherein the DFS module to perform an action based on the analysis of the output waveform model comprises the DFS module to:
    determine that the analysis of the output waveform model matches a known waveform; and
    switch an operating frequency of the access point based on the determination that the analysis of the output waveform model matches a known waveform.

4. The access point of claim 1, wherein the DFS module to perform an action based on the analysis of the output waveform model comprises the DFS module to:
    determine that the analysis of the output waveform model does not match a known waveform; and
    refrain from switching an operating frequency of the access point based on the determination that the analysis of the output waveform model does not match a known waveform.

5. The access point of claim 1, wherein the plurality of characteristics corresponding to the received waveform comprises:
    a frequency;
    a duration;
    a pulse repetition interval (PRI);
    a gain; and
    a magnitude.

6. The access point of claim 1, further comprising the hardware processor to transmit the output waveform model to the DFS module.

7. The access point of claim 1, further comprising the DFS module to store the output waveform model in hardware of the DFS module as an input.

8. A non-transitory computer readable medium containing instructions executable by a processor to:
    receive a waveform at a radio of an access point, wherein the waveform comprises a plurality of pulses;
    determine a plurality of characteristics of the received waveform;
    determine a model of the received waveform based on the plurality of characteristics, wherein the instructions to determine a model of the received waveform further comprise instructions executable to:
    determine a plurality of parameters, wherein each of the plurality of parameters is based on a corresponding characteristic of the plurality of characteristics;
    construct an output waveform model based on the plurality of parameters, wherein the output waveform model corresponds to the received waveform; and
    transmit the output waveform model as an input waveform;
    analyze the output waveform model based on the plurality of pulses by determining that a subset of the plurality of characteristics corresponding to the received waveform match a known waveform, and determining that a signal strength of the received waveform matches a signal strength of the known waveform; and
    perform an action based on the analysis of the output waveform model.

9. The non-transitory computer readable medium of claim 8, further comprising instructions executable by the processor to:

determine that the output waveform model matches a model of the plurality of models of known waveforms; and in response, change an operating frequency of the access point.

10. The non-transitory computer readable medium of claim 8, further comprising instructions executable by the processor to:

determine that the output waveform model does not match a model of the plurality of models of known waveforms; and in response, refrain from changing an operating frequency of the access point.

11. The non-transitory computer readable medium of claim 8, further comprising instructions executable by the processor to:

store the output waveform model in a log of models of received waveforms; and retain the stored model of the output waveform model for future comparison.

12. The non-transitory computer readable medium of claim 8, wherein the instructions executable to determine a model of the received waveform based on the plurality of characteristics further include instructions executable to:

receive the determined plurality of characteristics; and organize the plurality of characteristics into a model of the received waveform.

13. The non-transitory computer readable medium of claim 8, wherein the instructions executable to compare the output waveform model with a plurality of models of known waveforms further comprises instructions executable to:

transmit the output waveform model to a dynamic frequency switching module of the access point; and determine a categorization of the output waveform model by the dynamic frequency switching module.

14. A method, comprising:

receiving a waveform at a radio of an access point;

transmitting the received waveform to a hardware processor of the access point;

determining a plurality of characteristics of the received waveform;

determining a model of the received waveform based on the plurality of characteristics, wherein determining a model of the received waveform further comprises:

determining a plurality of parameters corresponding to the plurality of characteristics;

constructing an output waveform model based on the plurality of parameters, wherein the output waveform model corresponds to the received waveform; and transmitting the output waveform to a hardware processor as an input waveform;

transmitting the output waveform model to a dynamic frequency switching module of the access point;

analyzing the output waveform model based on the plurality of pulses by determining that a subset of the plurality of characteristics corresponding to the received waveform match a known waveform, and determining that a signal strength of the received waveform matches a signal strength of the known waveform; and performing an action based on the analysis of the output waveform model.

15. The method of claim 14, further comprising:

analyzing the output waveform model based on a plurality of pulses of the received waveform; and storing the output waveform model at a log of the access point.

16. The method of claim 15, wherein analyzing the output waveform model further comprises:

determining that the output waveform model matches a model of a plurality of models of known waveforms; and designate the received waveform as a radar pulse based on the determination that the output waveform model matches a model of the plurality of models of known waveforms.

17. The method of claim 15, wherein analyzing the output waveform model further comprises:

determining that the output waveform model does not match a model of a plurality of models of known waveforms; and designating the received waveform as a non-radar pulse based on the determination that the output waveform model does not match a model of the plurality of models of known waveforms.

18. The method of claim 14, wherein determining a plurality of characteristics of the received waveform further comprises extracting information corresponding to the received waveform from the received waveform.

* * * * *